United States Patent

Choy

[19]

[11] Patent Number: 6,141,754
[45] Date of Patent: Oct. 31, 2000

[54] INTEGRATED METHOD AND SYSTEM FOR CONTROLLING INFORMATION ACCESS AND DISTRIBUTION

[75] Inventor: David M. Choy, Los Altos, Calif.

[73] Assignee: International Business Machines Corporation, Armonk, N.Y.

[21] Appl. No.: 08/979,713

[22] Filed: Nov. 28, 1997

[51] Int. Cl.[7] .................... G06F 17/30; G06F 12/14
[52] U.S. Cl. ................ 713/200; 705/52; 705/59
[58] Field of Search .................. 713/200, 201, 713/202, 189, 194; 709/229, 226; 711/163; 705/51, 52, 55, 57, 59

[56] References Cited

U.S. PATENT DOCUMENTS

| | | | |
|---|---|---|---|
| 5,295,266 | 3/1994 | Hinsley et al. | 709/101 |
| 5,629,980 | 5/1997 | Stefik et al. | 380/4 |
| 5,634,012 | 5/1997 | Stefik et al. | 705/39 |
| 5,638,443 | 6/1997 | Stefik et al. | 705/54 |
| 5,649,185 | 7/1997 | Antognini et al. | |
| 5,715,403 | 2/1998 | Stefik et al. | 705/44 |
| 5,742,759 | 4/1998 | Nessett et al. | 713/201 |
| 5,758,068 | 5/1998 | Brandt et al | 713/200 |
| 5,758,069 | 5/1998 | Olsen | 713/201 |
| 5,765,152 | 6/1998 | Erickson | 707/1 |
| 5,826,011 | 10/1998 | Chou et al. | 713/200 |
| 5,893,910 | 4/1999 | Martineau et al. | 707/10 |
| 5,922,073 | 7/1999 | Shimada | 713/200 |
| 5,922,074 | 7/1999 | Richard et al. | 713/200 |
| 5,941,947 | 8/1999 | Brown et al. | 709/225 |
| 6,009,525 | 12/1999 | Horstmann | 713/200 |
| 6,044,469 | 3/2000 | Horstmann | 713/200 |

FOREIGN PATENT DOCUMENTS

| | | | |
|---|---|---|---|
| 40-8263440 | 10/1996 | Japan | G06F 15/00 |

*Primary Examiner*—Robert W. Beausoliel, Jr.
*Assistant Examiner*—Christopher Revak
*Attorney, Agent, or Firm*—Sughrue, Mion, Zinn, Macpeak & Seas, PLLC

[57] ABSTRACT

A distributed content entity includes a protection specification and an information entity, in which the protection specification and the information entity are attached and transported together. The protection specification includes information for controlling the use of the information entity. A framework generates the distributed content entity, in which the framework includes a protection specification unit storing the protection specification and including an access control enforcement manager and an enhanced access control enforcement manager; an information unit for storing the protected information entity; and an access checking unit connected to the protection specification unit and the information unit. The access checking unit checks whether a user has a privilege to access the protected information entity based on the protection specification and the access control manager, and checks whether the requested access meets conditions determined based on the protection specification and enforced by the enhanced access control manager. An example of the enhanced access control manager is a terms and conditions enforcement manager for enforcing the terms and conditions of an agreement relating to permitted uses of the protected information entity.

66 Claims, 4 Drawing Sheets

INTEGRATED METHOD AND SYSTEM FOR CONTROLLING INFORMATION ACCESS AND DISTRIBUTION

BACKGROUND OF THE INVENTION

1. Field of the Invention

The present invention relates to data processing systems and networks. More specifically, it relates to controlling information access and distribution across one or more computing domains.

2. Description of the Related Art

Traditionally, an access control mechanism is used to protect information stored in an information system on a host computer or server for security and/or privacy. It allows registered/recognized users (and applications/agents acting on their behalf) to access (read, append, update, delete, create, etc.) information stored in the system. For each user, access is restricted to only the information that he/she is authorized to access and only for the operation(s) that he/she is authorized to perform, Accesses are always initiated by a user or an application program, and information protection ceases as soon as information leaves the information system.

There are two types of access control mechanisms: discretionary and mandatory. Discretionary access control is typically used in commercial systems where information entities (such as records, files, documents, folders, video clips) usually have ownership, and the owner of an entity can specify who can perform what operation on that entity. Such a specification is often called an access control list (ACL), which is essentially a collection of triplets each of which binds together specific user(s), operation(s), and entity/entities. The information entities and operations are particular to a specific information system, whereas the users can be generalized to include user accounts, roles and groups. Typically, the presence of an ACL represents an access authorization. Thus, by default, a user is not allowed to access an entity without an applicable ACL stored in the system, i.e., a triplet that covers the user's request in all three of its components, unless the user is the system administrator or the owner of the entity, or the entity is authorized for "any user". The owner of an entity can create, change, and delete ACLs for that entity at the owner's discretion. A fourth component can also be added to ACLs to specify the condition(s) for an ACL to be in effect, e.g., an activation/expiration date, the time of day, the day of week, an execution environment, etc.

Mandatory access control, on the other hand, is typically used in military systems where information entities do not have ownership. An entity, for example a document, is normally assigned a security classification and a subject category by a security officer. Only users who have a security clearance at the same level as the entity's classification or above, and at the same time have a "need to know" for the entity's subject category, can access this entity. The security classification of an entity can be altered and can expire.

Figure 1:
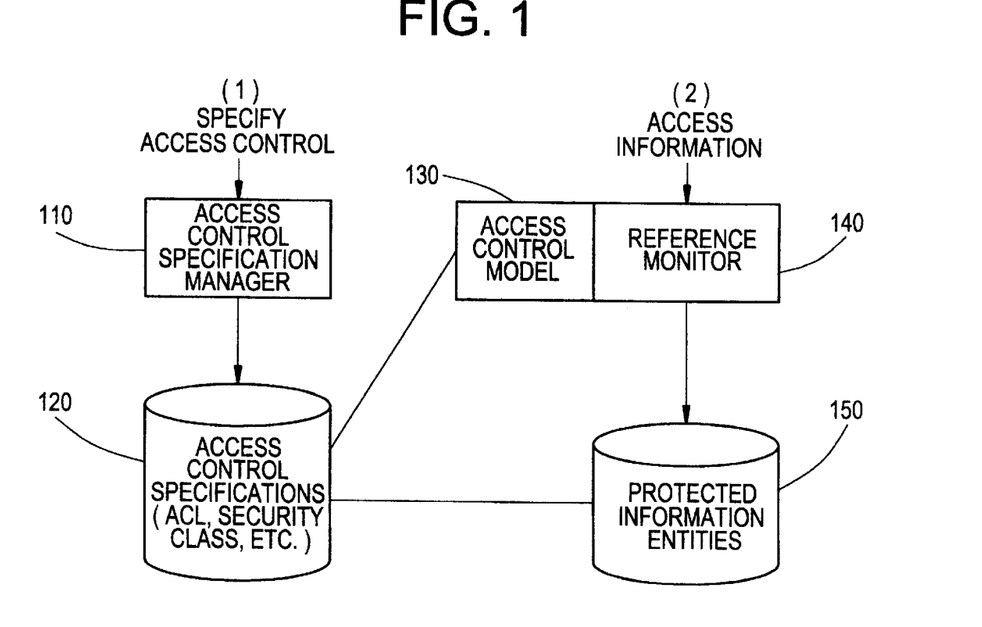
FIG. 1 is a block diagram showing a conventional system for specifying access controls to protect stored information entities and for controlling access to those information entities.

In both cases, the protection mechanism involves two separate activities: one is for privileged users to specify access controls, and the other is to control access by any user to the protected information stored in the system in accordance with access control specifications. These two activities are illustrated in FIG. 1. In fact, the first activity itself involves access control. Although many systems adopt simple, fixed criteria (e.g., an owner or a security officer) to limit access-specification privilege, such a privilege can in fact be granted in a discretionary manner just like an ordinary access privilege. The second activity typically involves a reference monitor 140. When a user or application accesses certain information entities managed by the system, the reference monitor 140 checks the access against the access control specifications 120 that are in effect using an access control model 130 (i.e., a particular method of searching and interpreting the ACLs or mandatory controls) supported by the system. If it is determined that the requested operation (e.g., to retrieve or update certain information) is allowed, the operation is executed. Otherwise it is rejected.

With the advent of network technologies, such as the Internet and the World-Wide Web (WWW), new information systems such as digital libraries have appeared, which not only manage the storage of digital contents but also handle content distribution, both within an enterprise and outside the enterprise. In this case, information protection is no longer confined to a closed information system but needs to extend "down-stream" to handle information that has been distributed over networks, between servers that are under different administration domains, and to client machines on end-users' desktops. That is, an end-to-end protection is needed.

Furthermore, in this end-to-end solution, information not only can be "pulled" by users (i.e., a user-initiated action) in a conventional way, but also can be "pushed" by suppliers (i.e., a supplier-initiated action). Therefore, information protection has to control not only the "access" to information, but also the "receipt" of information and the "use" and the "retention" of received information. Here, usage includes not only browsing and printing but also editing, transformation, replication, redistribution and other operations. Therefore, information protection must be expanded from access control to rights management, that is, the rights of information owners (e.g., authors, publishers), custodians (e.g., distributors, warehouses, libraries), and users. This includes, but is not restricted to, copyrights, terms and conditions specified in license agreements, integrity and authenticity of information, and user privacy.

To provide such protection, the state of the current art is to use a conventional access control mechanism to protect information stored in a system and to provide a separate rights management mechanism to protect information distributed outside an administrative domain using encryption; content marking/finger-printing, digital signature, and other techniques. It should be noted that, while 100% protection of the rights of all parties involved in information distribution may not be feasible with current technologies, it is frequently not needed for many applications. For example, some "leakage" is often acceptable when protection is primarily on economic value rather than on secrecy, especially if a less-than-100% protection scheme allows the system to be more efficient and easier to use, and/or makes content more available, thereby increasing usage.

Figure 2:
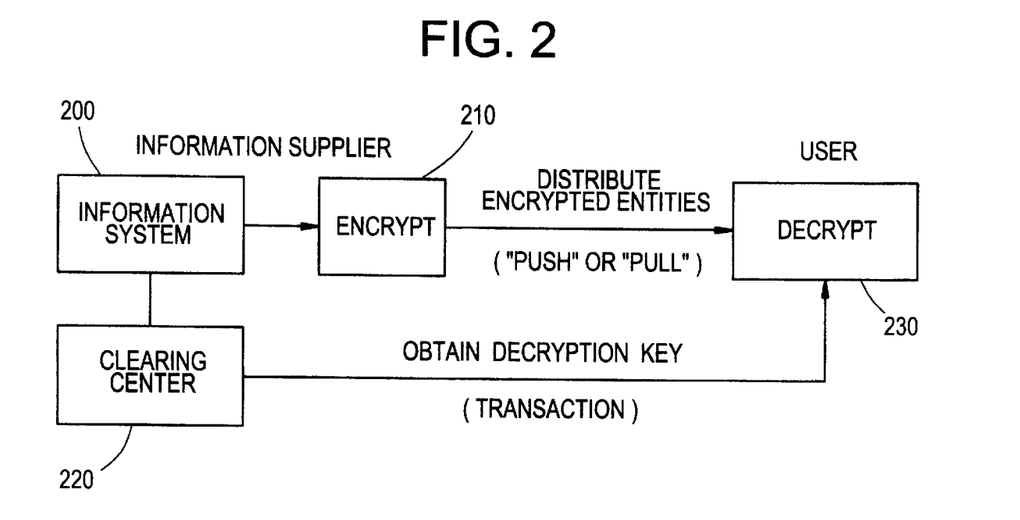
FIG. 2 is a block diagram showing a conventional system for distributing encrypted information.

One design to protect distributed information, is for an information supplier to distribute information entities in encrypted form, such as with IBM Corporation's CRYPTOLOPE scheme as shown in FIG. 2 below. In this manner, information can be distributed freely using any means without loss of protection. A user who wants to use an encrypted entity must obtain the corresponding decryption key to "unlock" the content. This key can be obtained from a clearing center server 220, which can be the information supplier, an authorized agent of the supplier, or a mutually trusted third party who provides the clearing service. A clearing center 220 must verify that the user has satisfied the criteria to receive the entity according to the terms and conditions (T&Cs) associated with that entity (e.g., by paying a fee), before providing the user with the corresponding decryption key. Any business transaction (e.g., payment) can be handled by yet another party.

However, this two-tier (separate access control and rights management) protection method has a number of problems, examples of which are set forth below.

Inconsistent protection between information accessed directly from a base information system and information distributed to users can result.

Rights management can be lost if protected information is distributed to a server which uses a conventional information system and relies on a conventional access control mechanism for protection.

License T&Cs for information acquired from outside sources and stored in an enterprise information system can fail to be enforced.

The clearing center 220, being external to the base information system 200, does not normally have knowledge about the information model, unless such description is replicated on every clearing center for all information entities that have been distributed, which is an enormous task. Such ignorance limits the capability of the clearing center. For example, assume a periodical subscription entitles the subscriber to free and unlimited use of articles and issues covered by the subscription. Without knowing the information model, a clearing center would not be able to determine whether or not a particular entity, such as an issue or article of one of the protected periodicals, is indeed covered by a subscription.

SUMMARY OF THE INVENTION

The present invention is directed to solving the above problems. More specifically, an object of the present invention is to provide consistency in protection of information content.

Another object of the invention is to simplify protection of information content by integrating conventional access control methods with enhanced access control methods to manage the use of the information content.

Yet another object of the invention is to provide a consistent protection model that operates across different information system platforms and uses various types and degrees of information access control.

Still another object of the invention is to provide an access control framework that supports distributing information content under both a "pull" and a "push" model, where the "pull" model provides access to the content in response to a specific request for the content, and a "push" model distributes the content without requiring a specific request for the content.

Yet another object of the invention is to provide an information content entity including both an information entity and a protection specification, specifying protection attributes of an information entity, in which the protection specification is attached to the information entity thereby allowing the protection specification to be distributed with the information entity.

To achieve the objects of the invention, the present invention provides a distributed content entity, which includes a protection specification and an information entity, wherein the protection specification and the information entity are attached, physically or logically to one another. The protection specification includes information for controlling the use of the information entity, and can include at least one of access control information, intellectual property rights management information, and integrity and authenticity assurance information related to the information entity.

The present invention is also directed to a framework for protecting a distributed content entity, wherein the distributed content entity includes a protection specification and an information entity. The framework includes an information unit for storing the protected information entity and a protection specification unit for storing the protection specification. The protection specification unit includes an access control enforcement manager and an enhanced access control enforcement manager. The framework also includes an access checking unit connected to the protection specification unit and the information unit. The access checking unit checks whether a user has a privilege to access the protected information entity based on the protection specification and the access control manager, and checks whether the requested access meets conditions determined based on the protection specification and enforced by the enhanced access control manager.

The invention is also directed to a method for transmitting a protected information entity, including generating a distributed content entity by combining the protected information entity with a protection specification, and transmitting the distributed content entity. The protection specification specifies access and privilege controls for using the protected information entity, and the method further includes encrypting the distributed content entity prior to transmission.

The invention is further directed to a program product, embodied on a computer-readable medium, for protecting a distributed content entity including a protection specification and an information entity. The program product includes a protection specification code means for storing the protection specification and includes an access control enforcement manager and an enhanced access control enforcement manager; an information code means for storing the protected information entity; and an access checking unit code means for checking whether a user has a privilege to access the protected information entity based on the protection specification and the access control manager, and for checking whether the requested access meets conditions determined based on the protection specification and enforced by the enhanced access control manager.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of an integrated method and system for controlling information access and distribution, according to the present invention, is described below in detail with reference to the accompanying drawings.

The invention described herein is directed to solving the problems discussed above. More specifically, the present invention is directed to combining a conventional access control mechanism with a rights management mechanism in a single information protection framework. This framework is characterized by the following design points.

Information protection includes access control (discretionary as well as mandatory), integrity and authenticity assurance, and rights management. Not all of these are necessarily needed for a particular application or a particular information entity.

Information protection "follows" the flow of information entities regardless whether they are pulled or pushed. In general, protection is not peculiar, or attached, to a single information system. Thus, protection is mobile and global rather than stationary and local.

Protection specifications are normally created/modified by the respective information owners (e.g., authors, publishers) or authorized users (e.g., security officers, administrators, secretaries).

Distributed Content Entity

Figure 3:
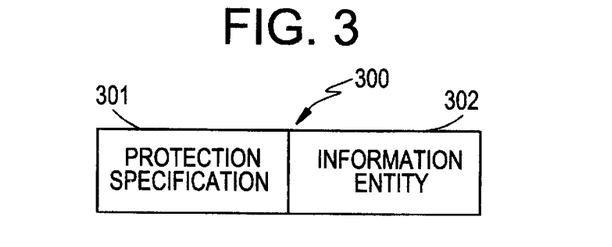
FIG. 3 shows a distributed content entity according to the present invention.

FIG. 3 shows a preferred embodiment of a distributed content entity 300. The distributed content entity includes a protection specification 301 and an information entity 302 in which the protection specification 301 is always "attached" to the information entity 302, physically or logically (through local or remote reference) or both, regardless of whether the information entity 302 is stored in an information system or is being distributed in a network. This structure is suitable for object-oriented implementation as specifications can be encapsulated inside the respective objects. It should be noted that not all protection specifications are associated with specific information entities. For example, a user privilege, described below in further detail, is a protection specification that is not associated with a particular information entity, but rather is associated with a specific user.

A "user privilege" specifies operations that a user can perform with respect to a certain collection of information entities rather than an explicit entity. One possible collection in this context is "all entities". It is like an ACL associated with a user. An access control model may require a user to have an applicable privilege in addition to an applicable ACL before his access request is allowed. In this case, a user who does not have an update privilege, for example, is denied of any update operation even if there are ACLs that allow him to do so on certain entities. Another access control model may only require either an applicable ACL or an applicable user privilege in order to gain access, or require an ACL only, or a user privilege only.

In one embodiment of the invention the protection specification 301 is contained in the same data entity, such as a computer file, as the information entity 302. Alternatively, the same data entity can be an object-oriented object, such that the protection specification 301 is encapsulated within the same object as the information entity 302.

Within a storage layer or repository which stores the information entity, the information entity preferably references its corresponding protection specification, thereby linking the information entity with the protection specification. Here, the referencing, or linking, is within a metadata database which contains metadata for the information entity. In this case the protection specification 301 is stored within the storage layer physically separate from the information entity 302.

The information entity and protection specification can be associated with one another so that referential integrity is maintained. The information entity 302, which includes the content to be protected, can be stored as a file in a file management system. The protection specification 301 can be recorded as metadata in a database, having a link to the file. In this example the information entity can be stored in external operating system files, and managed by a database as if the information entity was directly stored in the database. The database and link to a file which can be used to manage the information entity, is described in U.S. patent application Ser. No. 08/449,600 filed May 24, 1995, entitled "Method and Means for Linking a Database System With a System for Filing Data" to Cabrera et al. (hereinafter referred to as "Cabrera et al."), which is incorporated by reference herein. The protection specification 301 can be stored as metadata in the same row of the database as the link to the external file containing the information entity.

In another embodiment the system and methods described in a U.S. Patent Application entitled "Method and System for a Federated Digital Library by Managing Links" to H. M. Gladney (hereinafter referred to as "Gladney"), filed Sep. 29, 1997, and which is incorporated by reference herein, are used to link the protection specification 301 and the information entity 302. Here, the protection specification is not limited to metadata in the same database row as the link to the protected file containing the information entity. Rather, the protection specification can be another file, another database row in the same or another database, or an object separate from the information entity. A relationship record relates the protection specification to the information entity to maintain referential integrity.

An example of a storage layer which can be used to store the information entity 302 is a library service subsystem, as described in U.S. Pat. No. 5,649,185 to Antognini et al., which is incorporated herein by reference. Here, the information entity 302 can be, for example, an item, such as a document, which can be readily handled by the library service subsystem executable on one or more electronic digital computers. The protection specification can also be managed by such a library service subsystem, where the protection specification is stored either as an item in the library subsystem or stored in the library subsystem's library catalog as an attribute for the information entity.

Participant Information System

The protection specification 301 attached to an information entity 302 is expected to be enforced by all parties, servers, and services that handle the information entity, through a common model, representation, protocol and contractual agreement. Preferably, enforcement by each party is done conservatively such that an intended action that cannot be determined as allowable (e.g., for lack of information or lack of proper resolution capability) will not be allowed.

Figure 4:
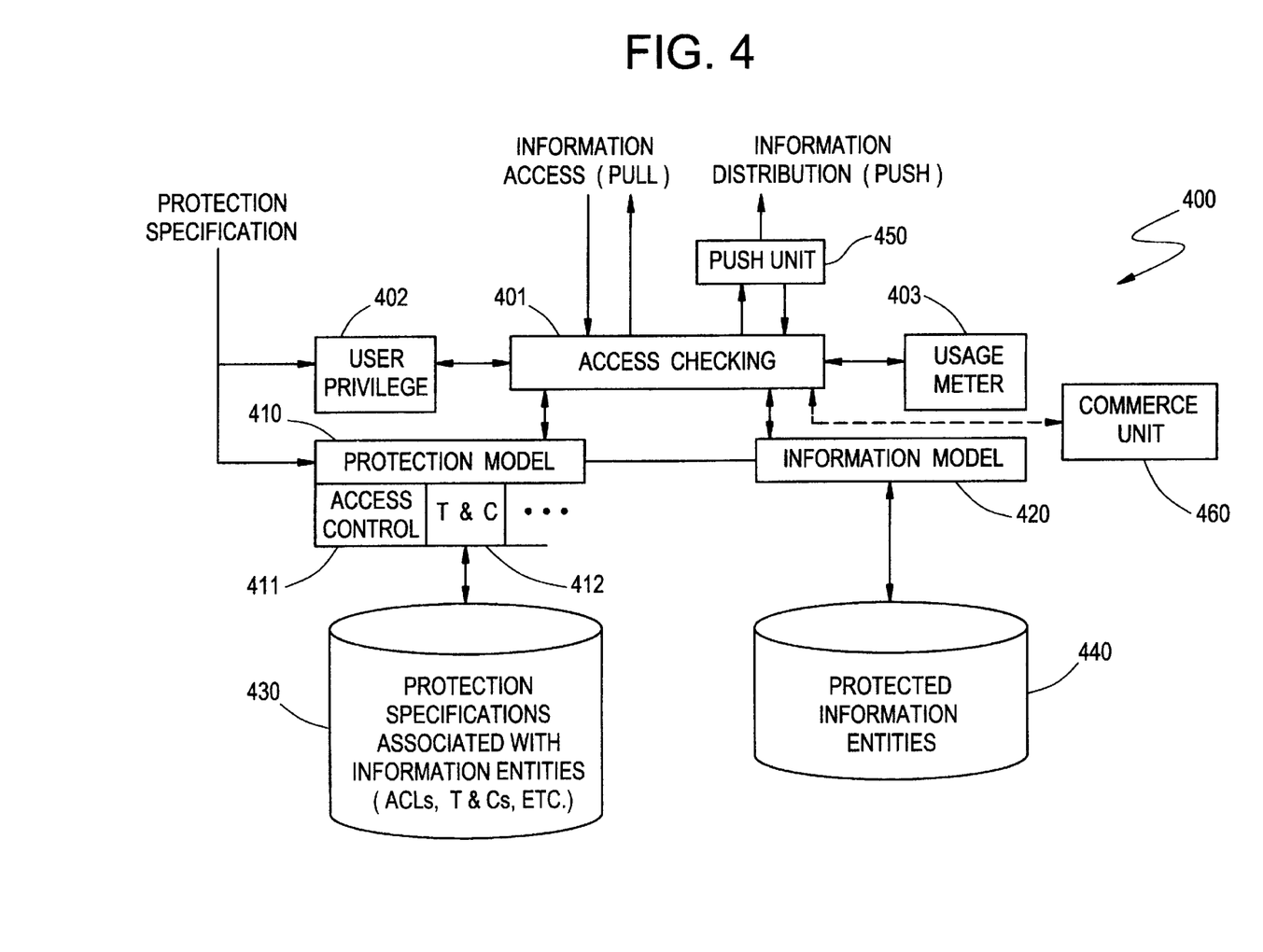
FIG. 4 shows a framework for distributing and using the distributed content entity of FIG. 3, according to the present invention.

A generic protection framework is used by all participant (inter-working) information systems. Underlying the framework is an agreement between participants to enforce the protections specified by the distributed content entity's protection specification. The framework, embodied as a participant information system 400 as shown in FIG. 4, is open and extensible with respect to the information model and the protection model. However, a common framework does not imply that all systems must have an identical access checking capability, as each system enforces protection specifications conservatively based on its capability. In general, a user can obtain content from any participant server or information system via a distributed content entity 300 depicted in FIG. 3.

The protection framework shown in FIG. 4 includes a protected information entity storage unit 440 which is connected to an information model 420. An information model describes high-level concepts regarding a certain class of information entities, including structures, properties, relationships, constraints, and operations. Examples include a document/folder model, a periodical model, etc.

Also included in the framework is a protection specification storage unit 430 which stores protection specifications 301 of distributed content entities. The protection specifications stored in protection specification storage unit 430 can be related to corresponding information entities which are stored in the protected information entity storage unit 440.

A protection model 410 is included in the framework and it includes one or more protection enforcement managers, such as a conventional access control manager 411, for enforcing access control of an information entity stored in the protected information entity storage unit 440. In order to provide enhanced access control other types of protection managers are included with the protection model. For example, a terms and conditions (T&C) enforcement manager 412 can be included in the protection model 410 to enforce terms and conditions of a license agreement, for example, associated with a protected information entity stored in the protected information entity storage unit 440. In the example shown in FIG. 4 the access control information (e.g., an ACL) and the T&Cs related to an information entity are recorded in the protection specification associated with that information entity. The protection model receives protection specification information from a distributed content entity 300. Protection is enforced, whether through conventional access control or enhanced protection such as T&C enforcement, via the enforcement managers, according to the received protection specification. Further, the protection specifications can be stored in protection specification unit 430 for future use and distribution. The protection model 410 is connected with the information model 420 to the extent necessary for ensuring that the protection model provides protection for the supported document models.

An access checking unit 401 is connected to both the information model 420 and the protection model 410. The access checking unit 401 receives requests to access information entities stored in the protected information entity storage unit 440, and provides distribution content entities 300 (as shown in FIG. 3) for distribution.

A user privilege unit 402 and a usage meter 403 can be provided, each of which is connected to the access checking unit 401. The user privilege unit 402 keeps track of a user's privileges, and the usage meter keeps track of the number of accesses of an information entity by a user.

A user does not have to have a registered identifier (id) to access an information system. For example, the user can access information that are classified as freely available to the public, or can access proprietary information by paying a fee as specified in an applicable T&C.

User privileges, determined by user privilege unit 402, are authorities possessed by a user, an account, a role, or a group. They can be specified and stored, or can be obtained at run-time. Examples of the former include a user's role, credential, group membership, privilege granted by other users, ownership, and subscription. Examples of the latter include privileges possessed by the invoked application, inherited from the parent process, acquired through a transaction (e.g., by paying a fee), and holder of a proxy.

The information usage meter 403 can be included to handle accounting and enforce usage-based T&Cs (e.g., a content subscription or lease that entitles a user to print a certain number of copies with extra printing at additional cost). The usage meter is also used to produce various reports for authorized parties such as publishers and librarians.

A push unit is optionally used in a participant information system which operates to "push" information to users and other information systems, as opposed to pulling information in response to a specific request for that information. The push unit 450 operates to request from the access checking unit information to be pushed outside of the participant information system 400. The access checking involved in accessing information to be pushed can be similar to that provided for a pull request, in which the push unit appears as a user having certain privileges. More likely, however, the push unit will be given more global access to protected information since the push unit is under the same control as the participant information system 400, and likely has more sweeping privileges.

The participant information system 400 optionally can contain a commerce unit 460, or have a connection to an external commerce unit as indicated by the dashed line in FIG. 4. The commerce unit 460 operates to execute a transaction related to the protected information. For example, a user may exceed a subscribed number of accesses to print a journal article stored as a document in the protected information entity storage unit 440. Accordingly, the user may, in this example, print an additional copy of the article for an additional fee. In order to collect the additional fee the user interacts with the commerce unit 460 to execute a transaction to purchase the right to print an additional copy of the article. The commerce unit 460 sends a message to the access checking unit 401 indicating that the transaction is successfully complete and indicating that the user should be given access to print a copy of the article. Alternatively, the access checking unit can initiate a transaction with the commerce unit, based on interactions with the user, to purchase additional rights.

The access checking unit 401 is the core of the protection mechanism. Utilizing information models, protection specifications, user privileges and usage meters, it controls information accesses, manages rights, and honors contractual agreements.

When information content is to be distributed from one participant information system to another, or to a user, the information entity 302 and its corresponding protection specification 301 are retrieved via the access checking unit 401, through which the information entity is retrieved from the storage unit 440 and the corresponding protection specification is retrieved from the storage unit 430. The retrieved information entity and its corresponding protection specification are packaged into a distributed content entity 300. Suitable content distribution protection techniques (e.g., watermark, digital signature, encryption) can be applied to the distributed content entity 300 before it is distributed (not shown).

When a participant information system receives a distributed content entity 300, after decryption and authentication as needed, the information entity 302 and its protection specification 301 are extracted from the distributed content entity 300 and are stored into the system through the access checking unit 401. The information entity 302 is interpreted using the information model 420 and is stored in the protected information storage unit 440, whereas the protection specification is interpreted using the protection model 410 and is stored in the protection specification storage unit 430.

Consumer "Pull" and "Push" Operations

A pull operation is an operation in which a user (either a human, an application program or an agent), who is a consumer of the protected information, or another participant information system, makes a request to perform a specified operation on a protected information entity in a certain information collection. A push operation is an operation in which a protected information entity is distributed to one or more users or to one or more other participant information systems, in response to an event occurring within the participating information system. Both the pull and push operations are implemented using computer-based systems running computer programs embodied on a tangible medium, such as magnetic or optical media.

Figure 5:
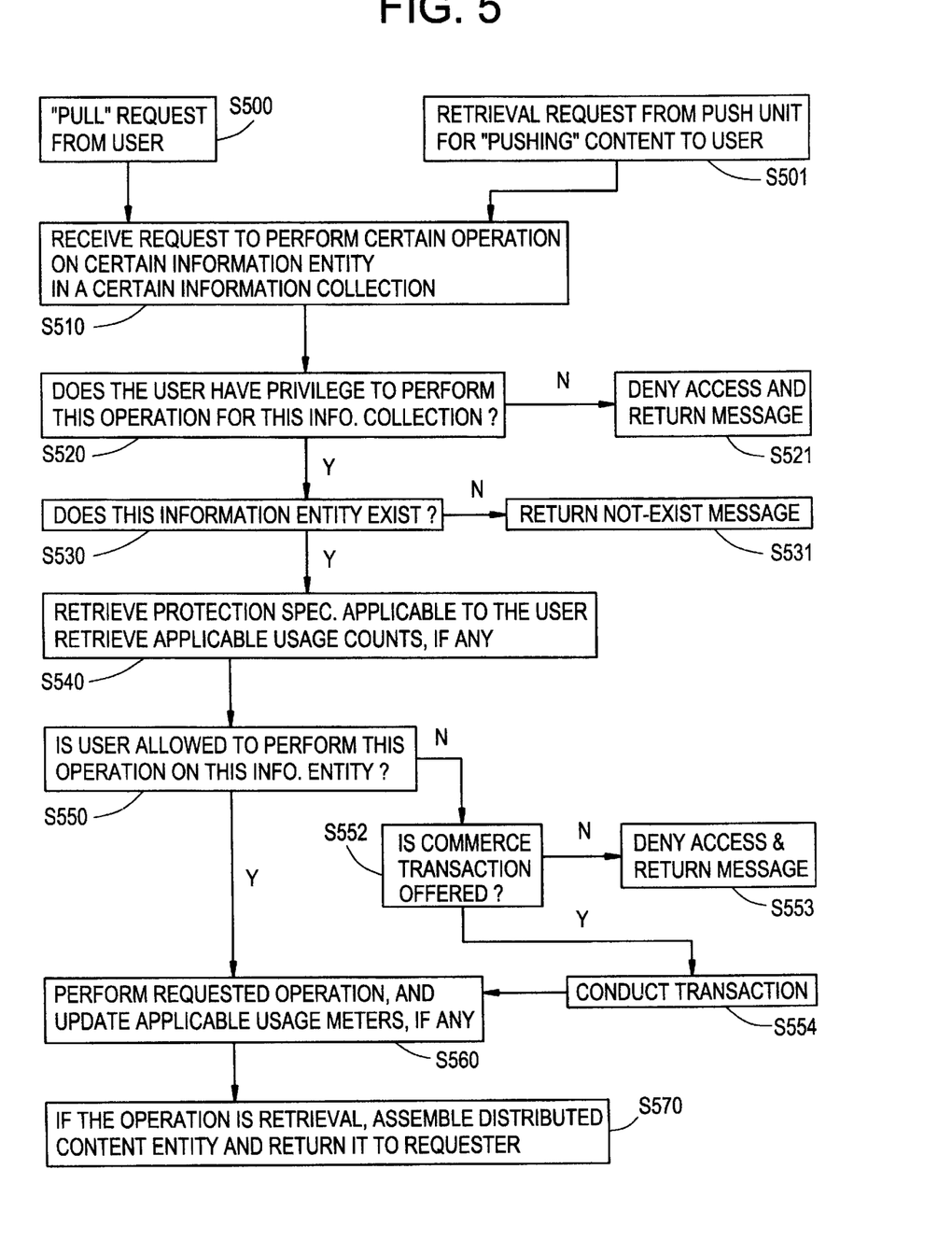
FIG. 5 is a flowchart showing pull and push operations for a user or other participant information system acting as a consumer.

The flowchart shown in FIG. 5 depicts a preferred embodiment of pull and push operations where the protected content, e.g., a protected information entity, is "pulled" by or "pushed" to a user. The method depicted in FIG. 5 is also applicable to another participant information system, acting as a consumer rather than as a supplier, requesting that an operation be performed on the information entity. The preferred method shown in FIG. 5 is described here using the participant information system framework embodiment shown in FIG. 4. Although, the inventive method is not limited to being performed by that embodiment of the framework.

Here, a "pull" request, or in other words a request to perform a specified operation on a specific information entity within a certain information collection, is sent by a user (S500). In a "push" request the push unit 450, which is part of the participant information system 400, generates a retrieval request in order to automatically distribute an information entity to one or more entities external to the participant information system (S501).

The access checking unit 401 receives the request from either the user requesting a "pull" operation or from the push unit 450 for performing a "push" operation (S510). In response to the received request the access checking unit 401 determines whether the user has the privileges to perform the requested operation for the information collection (S520). If not, the user is denied access and a message indicating the denial is returned to the user (S521). In determining whether a user is privileged to access the information collection, the access checking unit 401 consults the user privilege unit 402. If the user has the appropriate privileges to access the collection the access checking unit determines whether the requested information entity exists in the collection (i.e., the protected information entity storage unit 440) managed by the participant information system receiving the request (S530). If it is not present a message indicating that condition is returned (S531).

Optionally, the access checking unit 401 checks the push unit's privileges, much as it would check a requesting user's privileges (S520). This option would be exercised in the case where not all the protected information entities stored in the collection are permitted to be pushed, or where separate push units push to separate sets of users and those push units have different levels of authorizations. If the push unit's privileges are not adequate for pushing the requested information entity, the push unit is provided with a failure message (S521).

If the requested information entity is present in the protected information entity storage unit 440 then the corresponding protection specifications applicable to the user, and only those protection to specifications applicable to the user, are retrieved from the protection specification storage unit 430 (S540). The access checking unit 401 also can check the usage meter 403 for applicable usage counts, if any, associated with the requested information entity (S540).

Based on the protection model for the protected information entity the access checking unit 401 determines from the applicable protection specification whether the user is to be provided access to the requested information entity to perform the requested operation (S550). A condition for determining whether access to the requested information entity is to be provided to perform the requested operation, may be the number of remaining permitted uses for the user. To determine this, the access checking unit 401 determines, based on the usage counts from the usage meter 403, the number of remaining uses for the requested access. If the user's privileges are not adequate for the requested access, based on the protection specification(s) and the appropriate enforcement manager, the access checking unit 401 determines if a commerce transaction is to be offered to the user for performing the requested operation on the specified information entity (S552). If so and the user accepts the offer, a transaction (e.g., payment of a fee) is conducted via commerce unit 460 (S554). If a transaction is not to be offered to the user, a message is provided based on the protection model (S553). An example of such a message is a reason code indicating the reason why the requested information entity was not provided. Alternatively, access can merely be denied with no reason provided.

If the user's privileges are adequate for the requested access, based on the protection specification(s) and the appropriate enforcement manager, or if a transaction is completed to make the user's privileges adequate, the access checking unit 401 allows the requested operation to be performed on the specified information entity according to the information model 420 (S560). Accordingly, the applicable usage meters, if any, are updated.

If the requested operation is retrieval of the specified information entity, the access checking unit 401 retrieves the requested information entity from the protected information storage unit 440 according to the information model 420. The access checking unit 401 then combines the retrieved information entity which was requested, with its corresponding protection specification(s) into a distributed content entity 300 as shown in FIG. 3 (S570). The access checking unit 401 then sends the distributed content entity 300 to the requesting user to complete the pull operation, or to the push unit 450 to complete the push operation. Alternatively, the access checking unit 401 sends, or "pushes," the distributed content entity 300 directly to the user(s) identified by the push unit to complete the push operation.

Optionally, the distributed content entity 300 can be encrypted by the participant information system 400. Upon receipt, the receiving user or another participant information system decrypts the received distributed content entity 300, as shown in FIG. 2. A decryption key can be obtained from either the other participant information system or the clearance center 220.

Supplier/Distributor "Pull" and "Push" Operations

Figure 6:
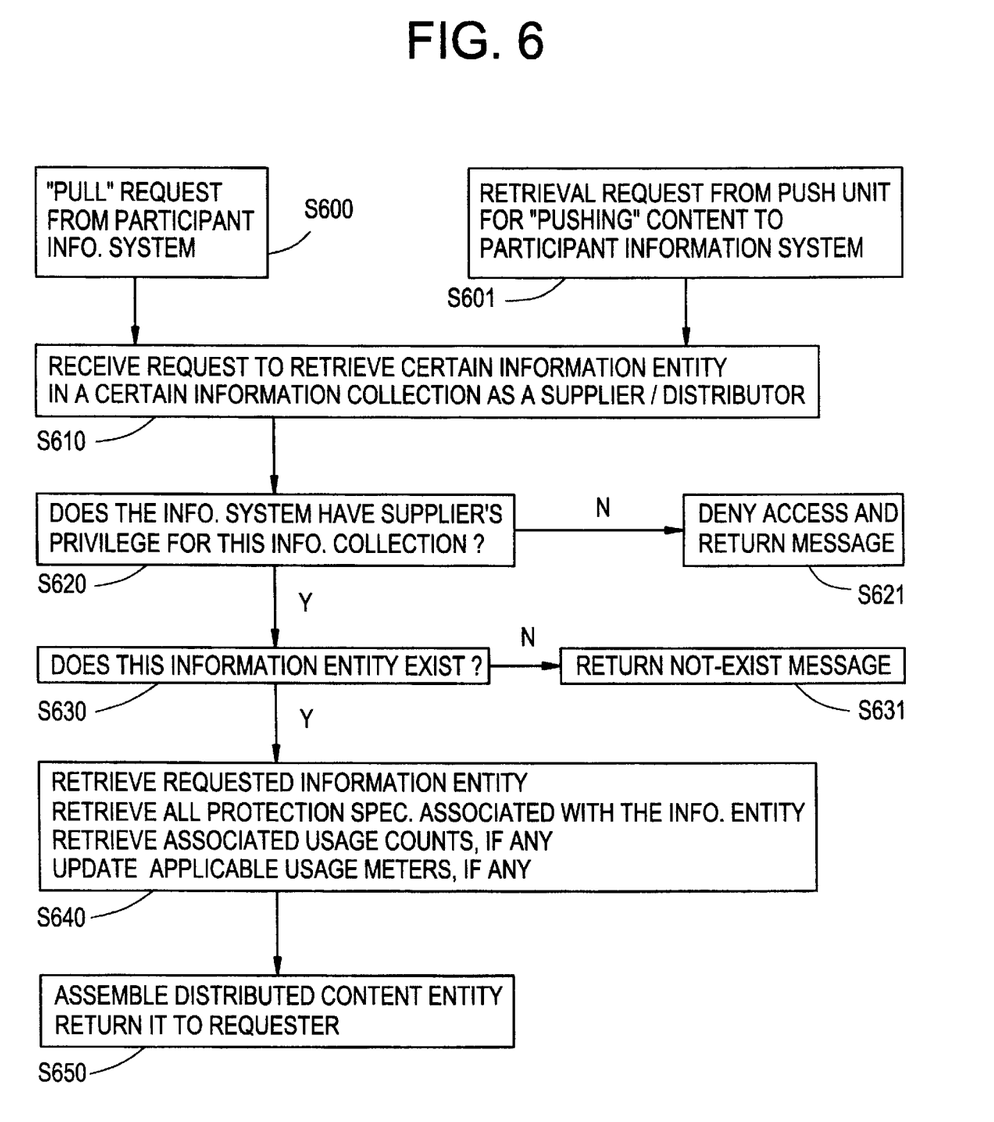
FIG. 6 is a flowchart showing pull and push operations for another participant information system acting as an authorized content supplier.

An embodiment of the invention is shown in FIG. 6 where "pull" and "push" operations are performed with respect to another participant information system acting as a supplier or distributor of the content to users (or to other participant information systems acting as consumers). Here, a participant information system sends a request to perform a supplier/distributor operation on a specific information entity stored in a certain information collection, i.e., the protected information entity storage unit 440, (S600). Also, the push unit 450, which is part of the participating information system 400, sends a request to the access checking unit 401 to perform a supplier/distributor operation (i.e., a "push" operation) on a protected information entity stored in the protected information entity storage unit 440 (S601).

The access checking unit 401 receives the requests from the requesting participant information system and the push unit 450 (S610). In response to receiving a request from either the requesting participant information system or the push unit 450, the access checking unit 401 determines whether or not the requesting participant information system or the participant information system to which the requested information is to be pushed, has the privileges of a supplier or distributor for the information collection managed by the access checking unit 401 (S620). If not, access to the information collection is denied and an appropriate message is returned (S621). If the privileges are those of an authorized supplier or distributor the access checking unit 401 determines if the requested information entity exists in the protected information entity storage unit 440 (S630). If not, a message is returned indicating the requested information entity is not present in the data collection (S631).

If the requested information entity is present in the data collection the access checking unit 401 retrieves the requested information entity via the information model, and retrieves from the protection specification storage unit 430 all the protection specifications associated with the retrieved information entity, not just those applicable to the requesting user as in the method illustrated in FIG. 5 (S640). If a usage meter (403) is associated with the retrieved information entity the appropriate usage count is retrieved and updated (S640). The access checking unit 401 then assembles the retrieved information entity with all of its associated protection specifications into a distributed content entity (S650).

If the request comes from another participant information system, i.e., a pull operation, the access checking unit sends the distributed content entity to the requesting participant information system. If the request comes from the push unit 450, the distributed content entity is sent to the push unit 450 for distribution, i.e. for being pushed to the other participant information system(s). Alternatively, the access checking unit 401 sends the distributed content entity directly to the other participant information systems identified by the push unit 450.

Distributed Content Entity Reception

Upon receiving a distributed content entity 300, as shown in FIG. 1, a participating information system performs the following actions to be in compliance with the agreement underlying the protection framework.

The distributed content entity is disassembled into its constituent parts. The protection specification is applied to the user privilege unit 402 to update the user privileges, if so specified in the protection specification. An example of this would be a protection specification transmitted by an administrative entity to update the user's privileges, as opposed to transmitting a protected information entity. The protection specification is also sent to the protection model for storing in the protection specification storage unit 430 based on the protection model.

If the distributed content entity contains an information entity 302, that entity is sent to the information model for storage in the protected information entity storage unit 440. When storing the information entity 302, the corresponding protection specification stored in the protection specification storage unit 430 is linked to the information entity.

Accordingly, if the participating information system later distributes the information entity, it would follow the procedure shown in FIG. 5 to construct a distributed content entity 300 containing both the information entity 302 and its protection specification 301. In this manner the information entity is protected based on the protection specification which travels with the information entity.

Optionally, the pushed distributed content entity 300 can be encrypted by the participant information system 400. Upon receipt, the receiving participant information control system decrypts the pushed distributed content entity 300, as shown in FIG. 2.

Information Clearing Center

An information clearing center 220, shown in FIG. 2, is essentially a reduced participant information system 400 including primarily the access checking unit 401, and without a need to manage or distribute information entities. In other words, all participant information systems have a "clearing center" function, although they may not all have the same level of capability. The applicable protection specifications and information model that are needed to clear an entity may come with the entity, or may be obtained locally or remotely. In the case of the protection model and the information model coming with the information entity, the distributed content entity 300, shown in FIG. 3, is expanded to define or identify the applicable protection and information models to be used with the protection specification 301 and information entity 302 in the distributed content entity 300.

To serve as a third-party clearing center, an information system has to be certified to comply with the agreement underlying the framework.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A distributed content entity embodied in a computer-readable medium, comprising:
   an information entity:
   a protection specification;
   wherein the protection specification includes information for controlling use of the information entity, the protection specification and the information entity are associated, and the protection specification is distributed with the information entity; and
   an identifier for identifying at least one of a protection model and an information model.

2. The distributed content entity according to claim 1, wherein the protection specification is physically attached to the information entity.

3. The distributed content entity according to claim 1, wherein the protection specification is logically attached to the information entity.

4. The distributed content entity according to claim 1, wherein the protection specification includes at least one of access control information, intellectual property rights management information, and integrity and authenticity assurance information related to the information entity.

5. The distributed content entity according to claim 1, wherein the distributed content entity is encrypted.

6. The distributed content entity according to claim 1, wherein the distributed content entity contains a digital signature.

7. The distributed content entity according to claim 1, wherein the distributed content entity is embodied in a computer-readable medium.

8. The distributed content entity according to claim 1, wherein the protection specification is located remotely from the information entity.

9. The distributed content entity according to claim 1, wherein the protection specification is attached to the information entity.

10. The distributed content entity according to claim 9, wherein the protection specification is indirectly attached to the information entity.

11. The distributed content entity according to claim 1, wherein the protection specification is associated with more than one information entity.

12. A framework for protecting a distributed content entity, the distributed content entity including a protection specification and an information entity, the framework comprising:
 a protection specification unit storing the protection specification;
 an information unit for storing the information entity, wherein the information unit is in a distributed arrangement with the protection specification unit; and
 an access checking unit connected to the protection specification unit and the information unit,
 wherein the access checking unit checks whether a user has a privilege to access the information entity based on the protection specification, checks whether the requested access meets conditions determined based on the protection specification, combines the information entity and the protection specification into a distributed content entity and sends the distributed content entity to a user, and wherein the protection specification includes one or more information items for controlling use of the information entity.

13. The framework according to claim 12, wherein the access checking unit performs the checking in response to a request from the user for access to the information entity.

14. The framework according to claim 13, wherein the user is one of an end-user consumer of the information entity and a distributor of the information entity.

15. The framework according to claim 14, further comprising a user privilege unit connected to the access checking unit, the user privilege unit storing user privileges.

16. The framework according to claim 14, further comprising a usage meter connected to the access checking unit, the usage meter recording a number of uses of the information entity and providing the recorded number of uses to the access checking unit when checking whether the requested access meets the conditions determined based on the protection specification, wherein one of the conditions is the number of allowed uses of the information entity.

17. The framework according to claim 16, wherein the access checking unit receives transaction information from a commerce unit indicating a transaction based use of the information entity is to be allowed.

18. The framework according to claim 12, wherein the access checking unit performs the checking in response to a request from a push unit for transmitting the information entity to the user without the user requesting the information entity.

19. The framework according to claim 18, wherein the user is one of an end-user consumer of the information entity and a distributor of the information entity.

20. The framework according to claim 19, further comprising a user privilege unit connected to the access checking unit, the user privilege unit storing user privileges.

21. The framework according to claim 19, further comprising a usage meter connected to the access checking unit, the usage meter recording a number of uses of the information entity and providing the recorded number of uses to the access checking unit when checking whether the requested access meets the conditions determined based on the protection specification, wherein one of the conditions is the number of allowed uses of the information entity.

22. The framework according to claim 21, wherein the access checking unit receives transaction information from a commerce unit indicating a transaction based use of the information entity is to be allowed.

23. The framework according to claim 12, wherein the protection specification contains only information applicable to the user.

24. The framework according to claim 12, wherein the protection specification contains all information items associated with the information entity being sent.

25. The framework according to claim 12, wherein the access checking unit combines the information entity and the protection specification into a distributed content entity only in response to the access checking unit checking and determining that the user has a privilege to access the information entity and that the requested access meets the conditions determined based on the protection specification.

26. The framework according to claim 12, wherein prior to sending the distributed content entity to the user, the distributed content entity is encrypted.

27. The framework according to claim 26, wherein the distributed content entity is encrypted according to an encryption method provided by a clearance center.

28. The framework according to claim 12, wherein the protection specification includes at least one of access control information, intellectual property rights management information, and integrity and authenticity assurance information related to the information entity.

29. The framework according to claim 11, wherein the distributed content entity further includes an identifier for at least one of a protection model and an information model.

30. The framework according to claim 12, wherein the protection specification is located remotely from the information entity.

31. The framework according to claim 12, wherein the protection specification is combined to be indirectly attached to the information entity.

32. The framework according to claim 12, wherein the protection specification is combined with more than one information entity.

33. The framework according to claim 12, further comprising an access control manager enforcing access to the information entity based on the protection specification.

34. An apparatus for generating a distributed content entity including a protection specification and an information entity, the protection specification containing information for controlling use of the information entity, the apparatus comprising:

a protection specification unit storing the protection specification;

an information unit for storing the information entity, wherein the information unit is in a distributed arrangement with the protection specification unit; and an access checking unit connected to the protection specification unit and the information unit, wherein the access checking unit combines the information entity from the information unit with the protection specification from the protection specification unit to form the distributed content entity for distribution.

35. The apparatus according to claim 34, wherein the access checking unit transmits the distributed content entity to a receiver without the receiver requesting access to the information entity.

36. The apparatus according to claim 35, wherein prior to transmitting the distributed content entity the distributed content entity is encrypted.

37. The apparatus according to claim 36, wherein the distributed content entity is encrypted according to an encryption method provided by a clearance center.

38. The apparatus according to claim 34, wherein the protection specification includes at least one of access control information, intellectual property rights management information, and integrity and authenticity assurance information related to the information entity.

39. The apparatus according to claim 34, wherein the distributed content entity further includes an identifier for at least one of a protection model and an information model.

40. The apparatus according to claim 34, wherein the protection specification is located remotely from the information entity.

41. The apparatus according to claim 34, wherein the protection specification is combined to be indirectly attached to the information entity.

42. The apparatus according to claim 34, wherein the protection specification is combined with more than one information entity.

43. The apparatus according to claim 34, further comprising an access control manager enforcing access to the information entity based on the protection specification.

44. A method for transmitting a protected information entity, comprising:

generating a distributed content entity by combining the protected information entity with a protection specification containing information for controlling use of the protected information entity, and an identifier for identifying at least one of a protection model and an information model; and transmitting the distributed content entity.

45. The method according to claim 44, wherein the protection specification specifies access and privilege controls for using the protected information entity.

46. The method according to claim 44, further comprising encrypting the distributed content entity prior to transmission.

47. The method according to claim 44, wherein the protection specification includes at least one of access control information, intellectual property rights management information, and integrity and authenticity assurance information related to the protected information entity.

48. The method according to claim 44, wherein the protection specification is located remotely from the information entity.

49. The method according to claim 44, wherein the protection specification is combined to be indirectly attached to the information entity.

50. The method according to claim 44, wherein the protection specification is combined with more than one information entity.

51. A program product, embodied on a computer-readable medium, for protecting a distributed content entity which includes an information entity and a protection specification containing information for controlling use of the information entity, wherein the protection specification is for distribution with the information entity, the program product comprising:

a protection specification code means for storing the protection specification;

an information code means for storing the information entity, wherein the information code means is in a distributed arrangement with the protection specification code means; and an access checking unit code means for checking whether a user has a privilege to access the information entity based on the protection specification, and for checking whether the requested access meets conditions determined based on the protection specification.

52. The program product, embodied on a computer-readable medium, according to claim 51, wherein the protection specification includes at least one of access control information, intellectual property rights management information, and integrity and authenticity assurance information related to the information entity.

53. The program product, embodied on a computer-readable medium, according to claim 51, wherein the distributed content entity further includes an identifier for at least one of a protection model and an information model.

54. The program product according to claim 51, wherein the protection specification is located remotely from the information entity if the user has a privilege to access the information entity.

55. The program product according to claim 54, wherein the protection specification is located remotely from the information entity.

56. The program product according to claim 54, wherein the protection specification is attached to the information entity.

57. The program product according to claim 56, wherein the protection specification is indirectly attached to the information entity.

58. The program product according to claim 54, wherein the protection specification is associated with more than one information entity.

59. The program product according to claim 54, further comprising an access control code means enforcing access to the information entity based on the protection specification.

60. An apparatus for receiving a distributed content entity including a protection specification associated with an information entity, the protection specification containing information for controlling use of the information entity, the apparatus comprising:

an access checking unit receiving the distributed content entity; and an information unit connected to the access checking unit and storing the information entity, wherein the protection specification is in a distributed relation with the information unit, and wherein the access checking unit records the information entity in the information unit, and controls use of the information entity based on the protection specification.

61. A method for receiving a distributed content entity including a protection specification associated with an information entity and an identifier for identifying at least one of a protection model and an information model, the protection specification containing information for controlling use of the information entity, the method comprising:

receiving the distributed content entity; and controlling use of the information entity based on the protection specification and the identifier, wherein the protection specification is in a distributed relation with the information entity.

62. The method according to claim 61, further comprising:

requesting a key for decrypting the information entity;

receiving the key only if authorization is granted based on the protection specification.

63. The method according to claim 61, wherein the protection specification is located remotely from the information entity.

64. The method according to claim 61, wherein the protection specification is attached to the information entity.

65. The method according to claim 64, wherein the protection specification is indirectly attached to the information entity.

66. The method according to claim 61, wherein the protection specification is associated with more than one information entity.

* * * * *